(12) United States Patent
Walsh et al.

(10) Patent No.: US 11,378,695 B2
(45) Date of Patent: Jul. 5, 2022

(54) IMAGE CORRECTION FOR LASERS SCANNERS

(71) Applicant: LEICA GEOSYSTEMS AG, Heerbrugg (CH)

(72) Inventors: Gregory C. Walsh, Walnut Creek, CA (US); Ashavini Pavaskar, San Ramon, CA (US)

(73) Assignee: LEICA GEOSYSTEMS AG, Heerbrugg (CH)

( * ) Notice: Subject to any disclaimer, the term of this patent is extended or adjusted under 35 U.S.C. 154(b) by 165 days.

(21) Appl. No.: 17/063,841

(22) Filed: Oct. 6, 2020

(65) Prior Publication Data

US 2022/0107419 A1 Apr. 7, 2022

(51) Int. Cl.
*H04N 5/232* (2006.01)
*G01S 17/894* (2020.01)
*G06T 7/90* (2017.01)
*G01S 17/86* (2020.01)

(52) U.S. Cl.
CPC ............ *G01S 17/894* (2020.01); *G01S 17/86* (2020.01); *G06T 7/90* (2017.01); *H04N 5/23229* (2013.01)

(58) Field of Classification Search
None
See application file for complete search history.

(56) References Cited

U.S. PATENT DOCUMENTS

| 8,042,056 B2 * | 10/2011 | Wheeler | G06T 19/00 |
| | | | 715/767 |
| 2018/0003493 A1 * | 1/2018 | Bernhard | G01C 5/00 |
| 2020/0402209 A1 * | 12/2020 | Talbert | G06T 5/005 |

FOREIGN PATENT DOCUMENTS

WO WO-2018232518 A1 * 12/2018 ........... G06K 9/6212

* cited by examiner

*Primary Examiner* — James M Hannett
(74) *Attorney, Agent, or Firm* — Maschoff Brennan

(57) ABSTRACT

In one example, a method may include receiving one or more laser scan of a scene, receiving two or more camera images of the scene, determining one or more decision regions where the camera images are different from one another, detecting edges of the decision regions where the camera images are different from one another, comparing the decision regions where the camera images are different from one another inside of the detected edges with a corresponding region in the laser scan to determine which of the camera images includes a desired region that more closely corresponds to the laser scan, and generating a corrected image including the desired region that more closely corresponds to the laser scan.

20 Claims, 9 Drawing Sheets

(a) (b) (c)

(d)                  (e)

IMAGE CORRECTION FOR LASERS SCANNERS

BACKGROUND

Figure 1A:
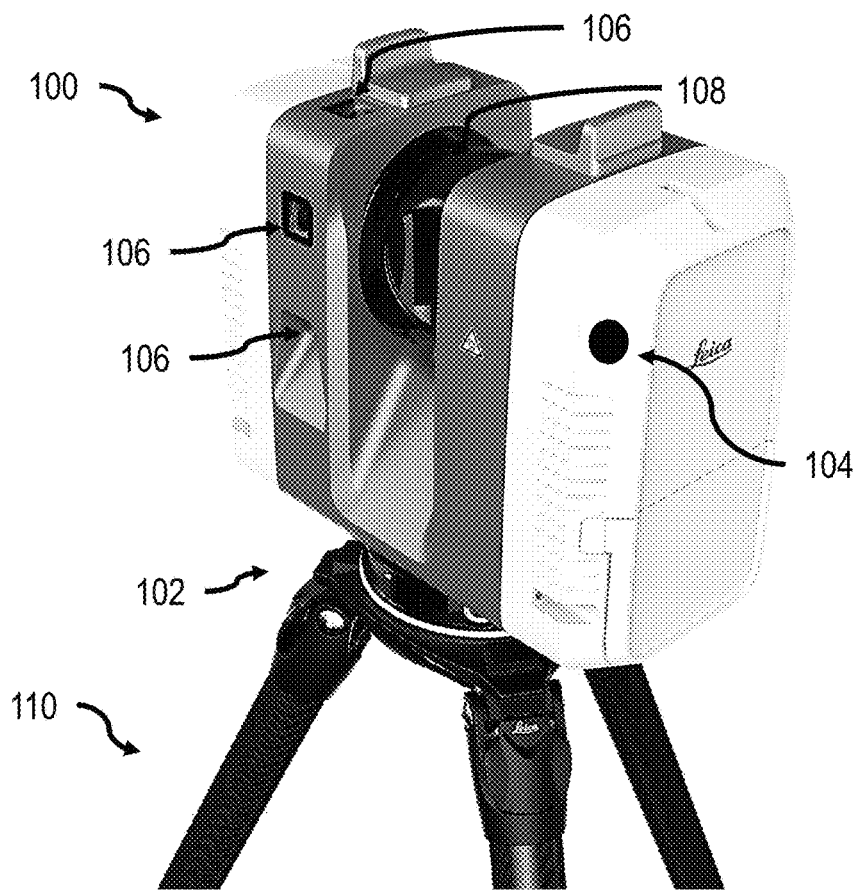

The present disclosure generally relates to correcting images associated with laser scan data from scanning devices.

Scanning devices may be used for capturing data regarding a three-dimensional (3D) reality using laser imaging, detection, and ranging (LIDAR) techniques such as those described in U.S. Pat. Nos. 7,701,558 and 5,988,862, which are hereby incorporated by reference in their entirety. Generally, the scanning devices may include some form of LIDAR that generates one or more range samples of one or more target surfaces. Such devices are referred to as laser scanners. The laser scanner may also include conventional cameras that take images and/or other data associated with a scene.

The claimed subject matter is not limited to embodiments that solve any disadvantages or that operate only in environments such as those described above. This background is only provided to illustrate examples of where the present disclosure may be utilized.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one non-limiting example, a method may include receiving one or more laser scan of a scene, receiving two or more camera images of the scene, determining one or more decision regions where the camera images are different from one another, detecting edges of the decision regions where the camera images are different from one another, comparing the decision regions where the camera images are different from one another with a corresponding region in the laser scan to determine, using the detected edges, which of the camera images includes a desired region that more closely corresponds to the laser scan and generating a corrected image including the desired region that more closely corresponds to the laser scan.

In another example, a laser scanner may include a laser rangefinder configured to acquire a three-dimensional point cloud of a scene, one or more cameras configured to obtain camera images of the scene, at least one computer-readable media configured to store instructions, and at least one processor coupled to the computer-readable media, the processor configured to execute the instruction to cause the processor to perform the method described above and any suitable variations.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

DETAILED DESCRIPTION

Scanning devices may be used for capturing data regarding a three-dimensional (3D) reality using laser imaging, detection, and ranging (LIDAR) techniques. Generally, the scanning devices may include some form of LIDAR that generates one or more range samples of one or more target surfaces. Such devices are referred to as laser scanners. The laser scanner may also include conventional cameras that take images and/or other data associated with a scene.

The LIDAR may be mechanically positioned by the laser scanner to sample a region of interest over time. The mechanical positioning of the LIDAR is described as scanning. The positioning process may determine an origin and direction of the LIDAR sample. Together with the range(s), the origin and the direction may be employed to generate sample point(s) in a base coordinate system. Each sample point, together with its ancillary data such as return intensity and/or color, may be described as a scan point. A collection of scan points may be described as a scan and/or intensity image. The scan may include scan lines, each of which may include a collection of scan points collected during a single mechanical motion or sweep.

The laser scanner may also include conventional cameras that take images and/or other data associated with a scene. Some of the cameras may be used to determine the position and/or movement of the laser scanner. Further, the cameras may be used to gather data regarding a scene, in addition to scan data obtained by the LIDAR. The disclosed embodiments include devices that use both camera images and laser scan data to generate corrected images. In particular, the corrected images remove errors or discrepancies caused by objects moving through a scene during a laser scan and/or image capture.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1B:
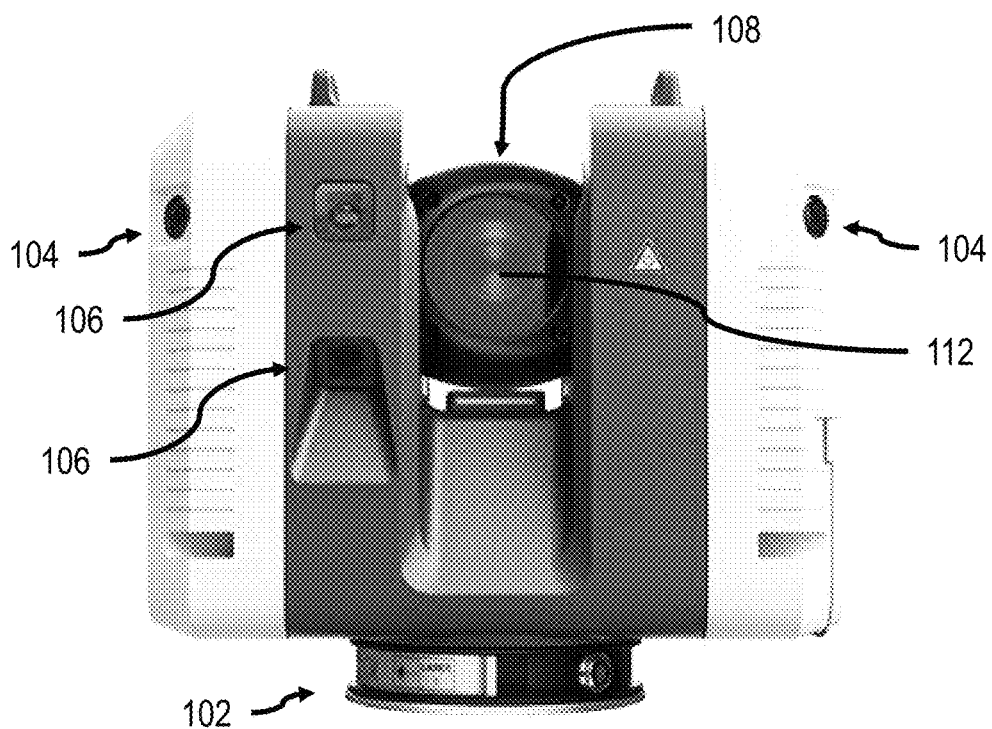

FIGS. 1A and 1B are views of an example laser scanner 100. In particular, FIG. 1A is a perspective view of the laser scanner 100 and FIG. 1B is a front view of the laser scanner 100.

The laser scanner 100 may be a commercially available laser scanner, for example, the RTC360 3D Laser Scanner produced by Leica Geosystems. However, the laser scanner 100 is just an example of one laser scanner that may be implemented according to the concepts described. The concepts described herein may be implemented with any suitable laser scanner.

The laser scanner 100 may be configured to mechanically sweep a laser beam over a 3D reality by rapidly rotating the laser beam about an approximately horizontal axis and rotating the laser scanner 100 and/or the laser about an approximately vertical axis incrementally and/or slowly relative to the rotation of the laser beam about the horizontal axis. The angular position of the laser beam about the approximately horizontal axis may be generally associated with an elevation of the laser beam. The angular position of the laser beam about the approximately vertical axis may be generally associated with an azimuth of the laser beam.

The laser scanner 100 may include a mount 102 which supports the laser scanner 100. The mount 102 may include connectors to mechanically couple the laser scanner 100, for example, to a support. As shown in FIG. 1A, the laser scanner 100 may be mounted on a support 110. In the illustrated configuration, the support 110 is a tripod support structure configured to be positioned on a surface, such as the ground, although other configurations may be implemented. For example, the laser scanner 100 may be mounted on a moving vehicle such as a car or plane.

The laser scanner 100 may include a LIDAR or laser rangefinder 108, which may be configured to acquire a full dome 3D point cloud at high speeds. For example, the rangefinder 108 may acquire up to 2 million points per second. The laser scanner 100 may include various cameras at positioned in various locations on the laser scanner 100, such as cameras 104 and 106. As shown, the cameras 104, 106 may be oriented in different directions and may be configured to obtain images and/or data regarding the same object or scene captured by the laser rangefinder 108.

Although only some of the cameras 104, 106 are visible in the view of FIGS. 1A-1B, in the illustrated example the laser scanner 100 includes five (5) of the cameras 104 and three (3) of the cameras 106. In some configurations, the cameras 104 may be Visual Internal System (VIS cameras) and the cameras 106 may be High Dynamic Range cameras (HDR cameras). The VIS cameras 104 may be used for tracking the position of the laser scanner 100 when the user moves the scanner from one place to another. The HDR cameras 106 may be used to acquire a full spherical HDR image for a specified time interval and/or during a scan. Accordingly, the laser scanner 100 may be combined with an imaging system.

The laser rangefinder 108 may emit and/or receive optical signals (laser signals) via an aperture 112. The aperture 112 may be moved across a field of view to collect measurements of range along with the direction for points in a scene for the laser rangefinder 108. The aperture 112 may be moved in a vertical and/or a horizontal direction. For example, the aperture 112 may be mounted on a central spinner that permits the aperture 112 to be moved vertically with respect to the body of the laser scanner 100. Further, the aperture 112 may be moved horizontally by rotating the laser scanner 100 with respect to the mount 102. In such configurations, the mount 102 may be configured to rotate the laser scanner 100 with respect to the support 110. However, other horizontal rotation configurations may be implemented.

The direction data and the range data acquired by the laser rangefinder 108 may be converted into 3D (x,y,z) coordinates or points (e.g., point data). The return intensity of the optical signals, that is, a number approximately proportional to the amount of light returned in the LIDAR pulse, may also be associated with the coordinates or points. The coordinates or points with associated return intensities may be referred to as a point cloud, which may be represented as an intensity image.

In one example configuration, the cameras 106 may take images of a scene surrounding the laser scanner 100 (e.g., "camera images"). In some circumstances, the cameras may take images at a different time than the laser rangefinder 108 is scanning the scene, although other configurations may be implemented. If the cameras 106 are HDR cameras, as described above, the images may be HDR images.

Because the exposure time of the cameras 106 may not be matched to the ranging time of the laser rangefinder 108, the cameras 106 may take images at times different than the laser scanning. In such configurations, the laser scanner 100 may be moved in order to take images that cover the entire field of view surrounding the laser scanner 100. In some aspects, the laser scanner 100 may be directed to scan a field of view more than one time. One example of a field of view is a "full dome" field of view. Thus, the laser scanner 100 may be configured to take images over a single field of view, covering the area of the scan, more than one time.

In one example, the laser scanner 100 may be configured to collect a set of two full dome scans using the laser rangefinder 108 and two full dome images using the cameras 106. In such configurations, the laser rangefinder 108 may first perform a scan for a full rotation of the laser scanner 100, followed by rotating the laser scanner 100 to capture the images by the cameras 106. This process can further be repeated for a second time, where the laser scanner 100 first captures point cloud data by the laser rangefinder 108 and then captures images using the cameras 106.

In operation, people, vehicles, objects or other entities may move past the laser scanner 100 while it is collecting data, for example, either while the laser scanner 100 is taking images or scanning and sometimes both. The resulting measurements may result in erroneous data or noise, even though the data results from true measurements. Ultimately, this erroneous data may not be desirable in the final point cloud and image set. Accordingly, removing these undesired measurements and the undesired sections of the images in an automatic manner is desirable. The described embodiments include devices and methods for removing undesired data associated with entities (people or objects) moving through a laser scan or image scan.

According to the concepts described herein, the laser scanner 100 may be configured to automatically determine which points and images of the double data set to present to a user, and to remove erroneous data caused by undesired entities moving through one or more of the laser scans or image scans. Thus, the disclosed configurations include devices and methods for detecting moving objects from a single laser scan of a scene and multiple sets of images of the same scene.

Objects that move through a scene do not stay still during imaging and/or scanning. Each laser scan, for example, takes place sequentially with some time (the single scan time) between each pass of the scene with the laser. With this time difference, objects that were once blocking a building or a wall have moved to block some other area. With the configuration of the laser scanner 100 described above, there may exist a greater temporal separation between two image sets and hence even more time for people, cars and other moving objects to be blocking different places.

According to the methods described herein, each laser scan measurement may be mapped to a 3D coordinate then projected onto a range image centered around the laser origin. The range image or depth may be formed by taking the normal of the 3D point from the scanner origin and as such represents spatial information.

The grid of the image may be selected to be slightly less resolved than the density of the scan, to ensure good coverage on the grid. The range images may then be compared on a grid cell by grid cell basis and the closest points may be chosen, for example, by a computer algorithm. In this manner, objects that moved through the laser scan during one scan but were not present for the second scan are typically removed and a cleaned laser scan may be produced. This laser scan may also be viewed as an intensity image (e.g., in grayscale) to make a comparison on a point to cell basis. Intensity images may be formed by projecting the intensity measurement returned by the laser scanner. Intensity measurements may depend on the color and other physical properties of a surface in the scene that is scanned. Points that fail the point to cell basis may be substituted with points from the other of the two laser scans. Furthermore, a pixel wise comparison may be made between the resulting composite images. This comparison may be done on the source images, the cube map result of compositing the images, and/or a panoramic image made from the cube map images.

Figure 2A:
Figure 2B:
Figure 2C:

FIGS. 2A and 2B illustrate an example where two people moved from one place to another between the two image captures. FIG. 2A may be referred to as a first camera image and FIG. 2B may be referred to as a second camera image. FIG. 2C illustrates a mask image obtained from the two images captured in FIGS. 2A-2B, which identifies and/or highlights the regions including the people or objects that have moved in the images of FIGS. 2A-2B.

To obtain the mask image of FIG. 2C, the camera images of FIGS. 2A-2B may be compared for pixelwise differences in their colors (e.g., red blue green or RGB colors) and the pixels with statistically significant differences may be identified and/or marked. Thus, although FIGS. 2A-2B are depicted in black and white, it should be appreciated that the images may be in color. Image pixels may always be slightly different, and so a pre-defined measure may be used to determine if the difference in a pixel is significant. For example, the standard deviation of the image noise may be used to identify statistically significant differences and to mark the pixels with significant differences. The different pixels may be marked by a function of the difference and the measure of the noise (the standard deviation of all of the differences over the entire set of images obtained).

In some aspects, simple linear comparisons may fail in bright areas, finding many false positives, and in dark areas, leaving behind many false negatives. Accordingly, the disclosed embodiments may implement custom comparison function that ameliorates these problems, as will be described herein.

When detecting differences between camera images, the comparison may be made on a pixel by pixel basis. The resulting mask, however, may include relatively small or sometimes pixel-level differences that may make it difficult or impossible to determine whether an object has moved in the area (e.g., to make a decision regarding the pixels or small groups of pixels).

Accordingly, the described methods may include identifying decision regions or areas. The decision regions may be identified by finding differences in pixels, for example, between a first camera image (e.g., FIG. 2A) and a second camera image (e.g., FIG. 2B). Further, regions of different pixels may be grouped together to determine a decision region. Additionally or alternatively, the decision regions may be obtained by consolidating patchy areas and/or removing very small decision areas (e.g., decision areas smaller than a certain size).

Such aspects may include image processing steps on the mask image and/or morphology steps, as described herein. Computer vision morphological operations may include dilation and/or erosion, or a combination thereof. Dilation grows the boundaries of a region and fills small holes. Erosion shrinks a region such that very small regions can disappear completely. The amount dilation or erosion implemented may depend on the size of the kernel used. The image processing steps and/or morphology steps may be implemented to generate a mask that encompasses the entire moving object(s). That is, when the steps are completed, each connected component covers the moving object and a small amount of area around the moving object. FIG. 2C illustrates an example of the mask, showing detected moved objects. Despite having only two people moving around, FIG. 2C still illustrates some remaining false positives of small size, indicated as dots or small portions of white pixels. Once this processing is finished, the connected mask components may be obtained.

In one example, each region in the mask image (e.g., FIG. 2C) with continuous and connected white pixels may be determined to be or classified as a single moving object. In such configurations, each individual connected component may be considered separately. Meanwhile, false positives of small size such as dots or small portions of white pixels, may be disregarded as non-moving objects or false positives. Such aspects will be described in further detail below.

Figure 2D:

According to the concepts described herein, the regions determined to be moving objects may be compared with one or more intensity images derived from a laser scan. The intensity images may represent the return intensity of the laser at each pixel location and thus may be obtained from the laser scan data, for example, from the laser rangefinder 108 (rather than the cameras 106). An example of any intensity image obtained from a laser scan is shown in FIG. 2D. As shown, the intensity image depicts the features of the same scene as shown in FIGS. 2A-2B. In some circumstances, the intensity image of FIG. 2D may be depicted in grayscale, while the camera images of FIGS. 2A-2B may be color images.

Since the intensity images are obtained from the laser rangefinder 108 rather than the cameras 106, the intensity images may appear differently than images obtained by the cameras 106, even if the camera images are depicted in black and white. In particular, the intensity (e.g., brightness) of images from the cameras 106 may be based in part on ambient light intensity and may thus differ depending on the amount of illumination in the scene (e.g., from light fixtures or natural sunlight). In contrast, intensity images from the laser rangefinder 108 are independent of any natural light occurring in the scene. In addition, the images from the cameras 106 may have a different aspect than intensity images from the laser rangefinder 108. Further, the resolution of the camera images from the cameras 106 and the intensity images from the laser rangefinder 108 are typically different. Thus, in many circumstances direct pixel matching between the camera images and the intensity images may not be practicable.

Although the pixels of the intensity images and the camera images may not be consistent with one another, what does remain consistent is the geometry of the underlying scene. Both the camera image and the intensity image share corresponding edges of objects at positions where the objects match. Thus, edge detection algorithms may be implemented to identify the edges of objects in the camera images and the intensity images, and further to transform the camera images and/or the intensity images into images of detected edges, which may be referred to as edge images. The detected edges in the edge images may then be used to identify moving objects.

In configurations where the laser scanner 100 takes two or more images from the cameras 106, objects that move between the two images may be identified based on regions in the camera images that have changed. Thus, for each region of the two camera images which is detected to be changed, the edges identified in the cameras images may be compared with the edges identified in the intensity image(s).

For the example shown, the people standing in the view of the cameras 106 may generate outlines in an edge image. As explained above, the resolution of the camera images and intensity images may not match, accordingly, the camera images and the intensity images may be projected or re-projected to a matching resolution. Then, a portion of the first camera image and the intensity image may be compared (e.g., the portion with a potential moving object), resulting in a first measure. In one example, the number of matching edge pixels may be counted in both the first camera image and the intensity image. Further, the second camera image may be compared with the intensity image, resulting in a second measure. In such aspects, the number of matching edge pixels may be counted in both the second camera image and the intensity image.

The matches between the first camera image and the second camera image may then be compared (e.g., by comparing the first measure and the second measure), and the camera image with the best measure of fit against the intensity image may be selected as the final result. Thus, the portion of the camera image with the best match will be selected as the true or best representation of the scene in that portion of the camera image, and the best match may be from either the first camera image or the second camera image, depending on the best match identified.

Figure 2E:
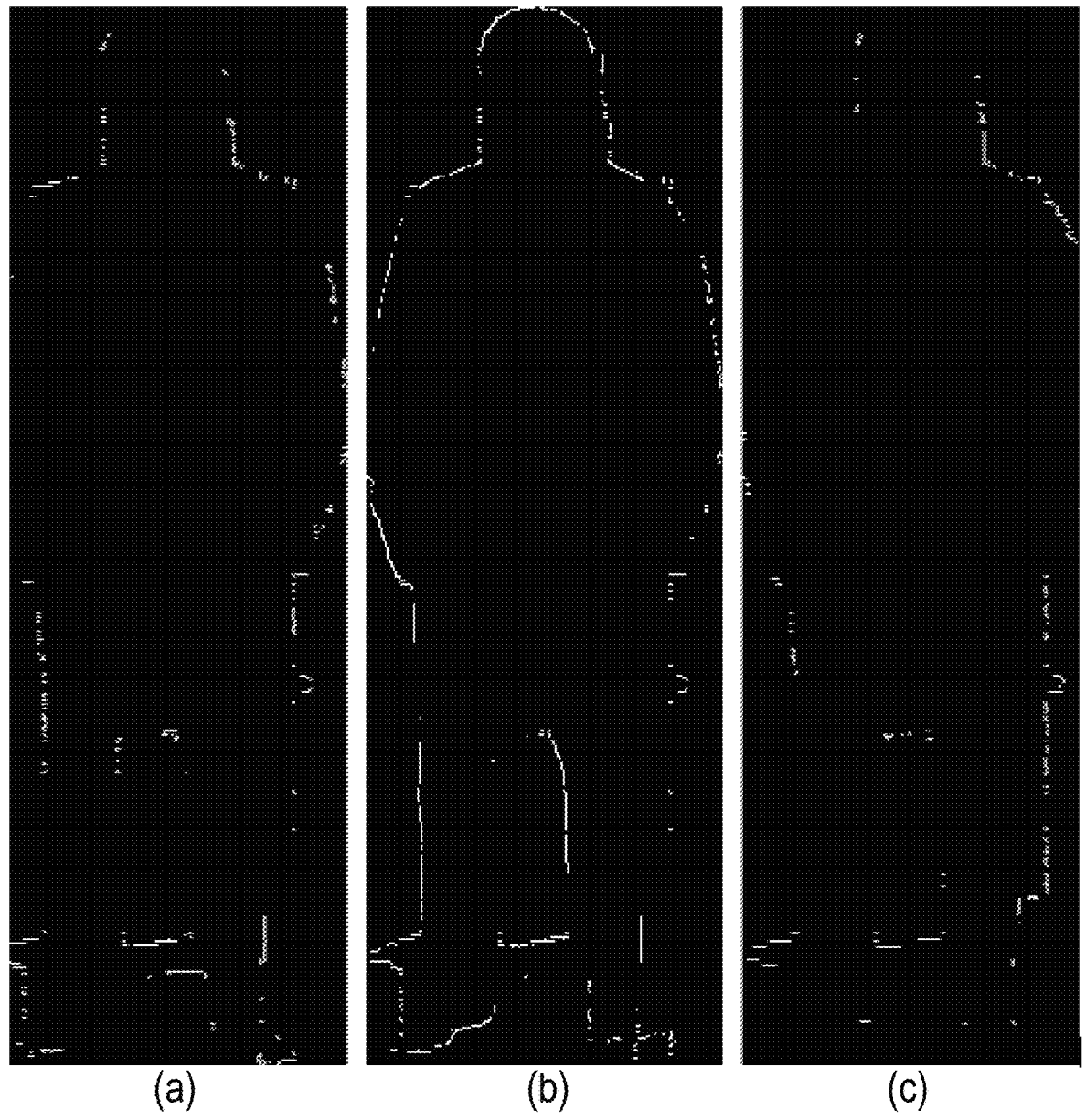

FIG. 2E illustrates an example of edge detection as described above, applied on one region obtained from the mask image of FIG. 2C. In FIG. 2E, (a) represents the edge detection resulting from the first camera image, (b) represents the edge detection resulting from the second camera image, and (c) represents the edge detection resulting from the intensity image. In the circumstance shown in FIG. 2E, the moving object was absent in the first camera image (a) and in the intensity image (c), but present in the second camera image (b). As shown in FIG. 2E, the edges of a person are relatively clear in the second camera image (b), whereas the edges detected in (a) and (c) are less clear. This difference may be used to select the correct camera image (e.g. either the first camera image or the second camera image) that best matches the intensity image. Thus, in this circumstance, the first image may be selected as the best match for the intensity image.

In some configurations, the edge detection applied to each region in the camera images and the intensity images may be further processed such that only the edges corresponding to the outline of the mask are kept for the final comparison. Additionally or alternatively, the edges detected inside of a mask may be considered as noise and disregarded to improve differentiation.

Generally, for a portion of a scene with a moving object, the regions adjacent to the moving object should match one another between the first camera image and the second camera image. Thus, the pixels adjacent to the moving object should match in the first camera image and the second camera image. However, in practice there is often slightly different light conditions every time an image set is taken. Also, the edges of a match region might not be very well defined, leaving bits of a moving object that is not identified as part of the moving object. Thus, the edges of the moving objects may not be properly depicted if the pixels from the best match region are directly substituted between the two camera images. Such aspects are shown for example in FIG. 2F.

Figure 2F:
Figure 2F:

In FIG. 2F, (e) represents a direct pixel by pixel substitution for replacing the moving objects in FIGS. 2A-2B. As shown in (e), the outline of the moving object is still visible, and there are color differences between the background of the moving object and features within the moving object. Thus, a direct pixel by pixel substitution results in an erroneous corrected image that does not fully remove the moving object.

Accordingly, once the best match for a given region is selected, a blending process may be implemented to generate a corrected image. For example, an area around the corrected region may be grown or otherwise increased to ensure the moving object is fully encompassed by the corrected region. Thus, the corrected region may be increased to encompass some of the area around the moving object that is identified. Additionally or alternatively, alpha mixing or other correction algorithms may be applied to smooth the transition between the first camera image and the second camera image in the areas proximate the moving objects.

In FIG. 2F, (f) represents a corrected image generated by alpha blending in the area proximate the border of the moving object. Comparing (e) and (f), it can be seen that the pants of the person (moving object) are incorrectly identified as being part of the planter that is behind the person, resulting in an error in the corrected image shown in (e). However, in (f) this error is corrected or hidden by blending the first camera image and the second camera image. Further, in (e) the feet of the person (moving object) creates shadows and other lighting effects that highlights that the person was removed, leading to some areas of the corrected image being lighter than the surrounding areas around the removed moving object. However, in (f) the blending process corrects or hides such errors.

Figure 2G:

FIG. 2G illustrates a blended and merged corrected image of the scene of FIGS. 2A-2B resulting from the processes described above. As shown in FIG. 2G, the moving objects (e.g., people) in the scene have been automatically detected, removed, and the areas around the moving objects have been smooth to generate the corrected image shown.

The aspects described may be implemented to automatically merge two or more camera images into a corrected image which removes objects that move between the different camera images (e.g., camera images taken at different times). The configurations described use two camera images and one intensity image, however, additional camera or intensity images may be implemented according to the aspects described to improve results.

In the disclosed configurations, camera images are compared on a pixel by pixel basis to identify differences between the two (or more) images. The differences between the camera images may then be processed to consolidate them into a collection of decision regions. Each of the camera images and an intensity image may be converted into edge images. For each decision region, a measure of match may be determined with respect to the intensity image. The camera image (e.g., the first camera image or the second camera image) with the largest or best measure of match may be used to correct that specific region of the scene, for example, to remove moving object(s). The first camera image and the second camera image may be merged to remove the moving object(s). To do so, the decision region may be expanded and an alpha mix or blended border may be implemented to correct pixels proximate the decision region, to correct or hide any errors.

While differences between two laser scans can often be reconciled in relatively small regions, such as pixel, cell or point by point decisions, camera images may require consolidated sets of differences, because comparing two pixels does not provide information regarding which pixel is correct. Accordingly, the disclosed configurations implement an intensity image produced by a laser scan that is used to make decisions between two inconsistent camera images to detect and remove moving objects.

Figure 3:
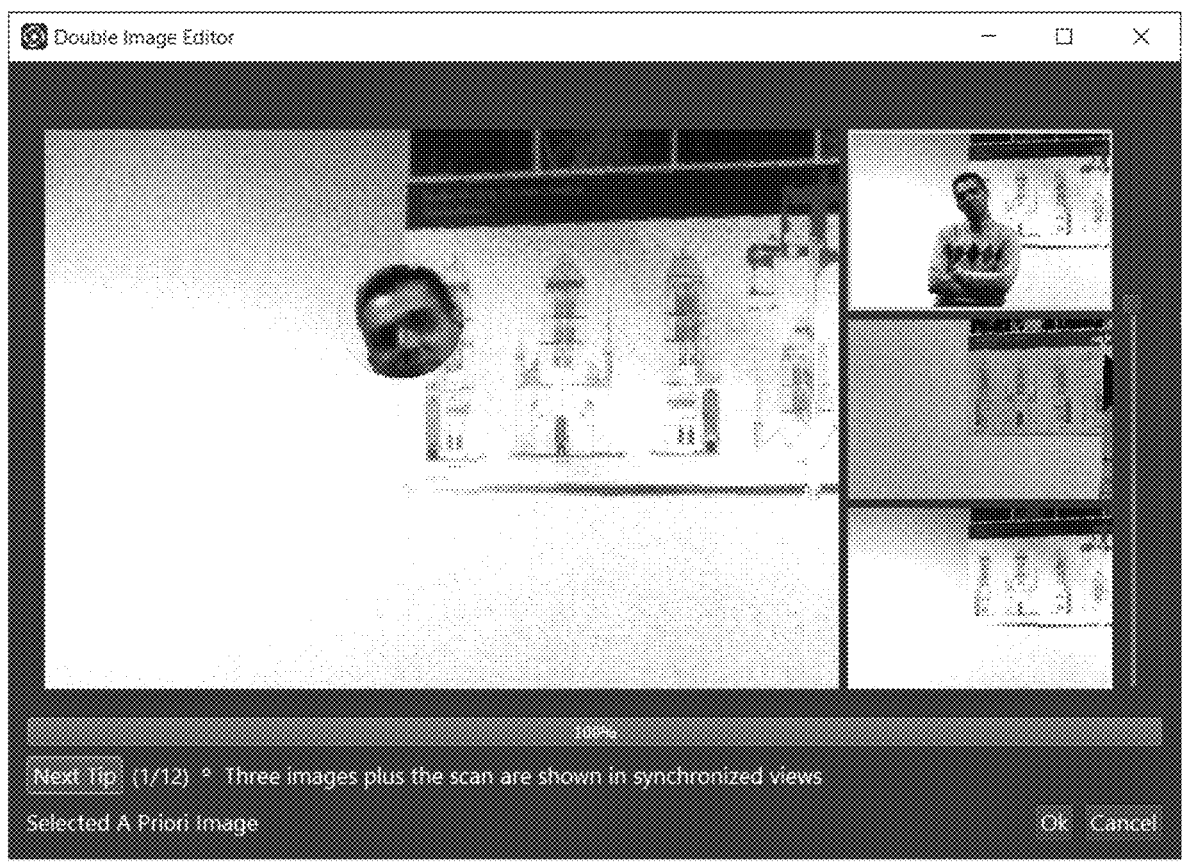

In some configurations, the embodiments disclosed may include an editing tool that permits a user to review and or edit the results of the automatic image correction described. FIG. 3 illustrates an example of a user interface for such an editing tool.

As shown, the right side of the user interface includes a comparison of the first camera image on top, the intensity image in the center, and the second camera image on bottom. The left side of the user interface illustrates the corrected or merged image resulting from the image correction described above. As shown, the user interface may include an inset window that permits the user to see a view of the second camera image positioned over the corrected image. For example, the user may use a cursor to select different areas in the corrected image to view portions of the second camera image overlayed over the corrected image. The user may further edit the results of the corrected image, for example, using the user interface and the cursor. For example, the user may edit the corrected image by painting or dragging the cursor over the corrected image to remove or add corresponding features from the first or second camera images. Such aspects may be used to edit the corrected image.

In some configurations, the laser scanner 100 may include a computing device that may be configured to perform various data processing and/or storage functions associated with the laser scanner 100. For example, the computing device may process and/or store data received from the cameras 104, 106 and/or the laser rangefinder 108. The computing device may further be configured to control aspects of the laser scanner 100, for example, the computing device may be configured to control the scanning or movement of the laser scanner 100, as well as the operation of the cameras 104, 106 and/or the laser rangefinder 108. The computing device may also be configured to perform steps and processes described herein. In particular, the computing device may perform the steps and processes described herein to automatically correct images obtained by the laser scanner 100.

Figure 4:
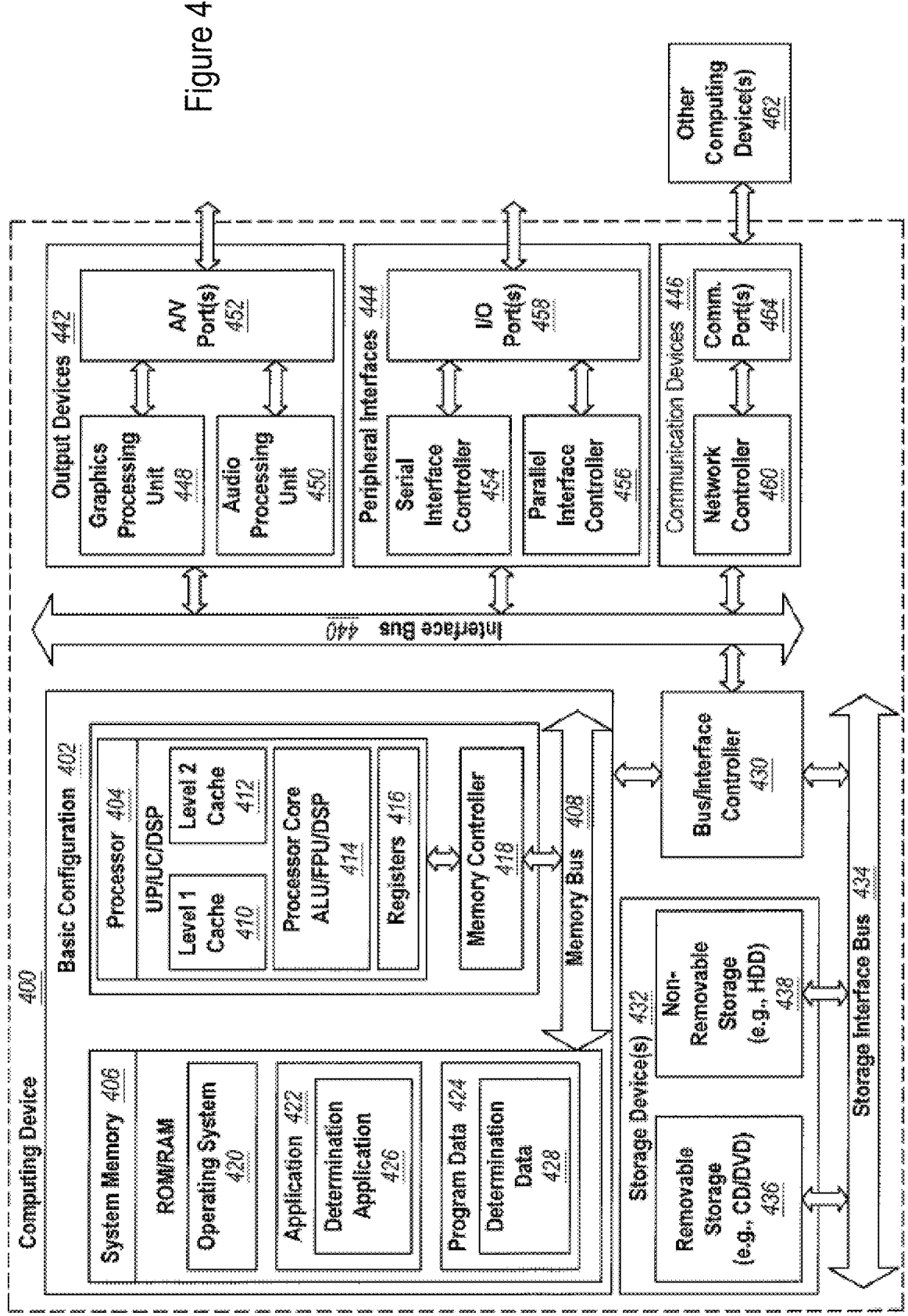

In other configurations, the computing device may be external to the laser scanner 100. For example, the computing device described may not be part of the laser scanner 100 and may instead be external to the laser scanner 100. Alternatively, the laser scanner 100 may include a computing device that performs at least some of the described functions, and another computing device external to the laser scanner 100 may perform other functions. FIG. 4 illustrates and example of a computing device in further detail, and such aspects may be included in the laser scanner 100 and/or external to the laser scanner 100.

FIG. 4 is a schematic diagram illustrating an example of a computing device 400, which may be configured to generate correcting images associated with laser scan data from a scanning device. In a very basic configuration 402, the computing device 400 may include one or more processors 404 and a system memory 406. A memory bus 408 may be used for communicating between the processor 404 and the system memory 406.

Depending on the desired configuration, the processor 404 may be of any type including but not limited to a microprocessor (µP), a microcontroller (µC), a digital signal processor (DSP), or any combination thereof. The processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include algorithms for correcting images associated with laser scan data from scanning devices according to the concepts described herein. Further, the application 422 may be configured to perform one or more of the operations associated with the methods described herein. Program data 424 may include data from the cameras 104, 106 and/or the laser rangefinder 108, used to generate the corrected images as described. In some embodiments, the application 422 may be arranged to operate with program data 424 on the operating system 420 such that generating corrected images may be performed. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. Data storage devices 432 may be removable storage devices 436, non-removable storage devices 438, or a combination thereof. Example computer storage media may include volatile and nonvolatile, removable and non-removable media implemented in any method or technology for storage of information, such as computer readable instructions, data structures, program modules, or other data. System memory 406, removable storage devices 436 and non-removable storage devices 438 are examples of computer storage media. Computer storage media includes any medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media. The computing device 400 may be implemented in the laser scanner 100 and/or as a separate computer.

In one example embodiment, a method may be implemented for automatically detecting and removing moving objects from camera images that are taken together with laser scans. The method may use either the intensity image of the laser scan (e.g., take by the laser rangefinder) or additional image data (taken, for example, by cameras). The disclosed embodiments may allow users to manually inspect, modify, and change the source image decision. The method may include identifying areas of agreement and disagreement in the images. Once the composite image with areas of agreement and disagreement in the images are identified, the method may use the regions of agreement to combine the source images into a clean composite image.

Further, a method may be implemented for detecting and removing moving objects from camera images taken together along with a laser scan of a scene. The method may include obtaining a laser scan along with two or more sets of camera images of the same scene. Accordingly, the laser scan and the sets of camera images may be directed to and obtain data about the same scene. In some configurations, the laser scan and/or the sets of camera images of the same scene are obtained at different times. In one example, the laser scan and each of the sets of camera images are all obtained at different times. In other examples, the laser scan and one of the sets of camera images are obtained at the same time, and another one of the sets of camera images are obtained at a different time than the laser scan.

The method may further include determining the regions of images that are different from each other based on statistical differences in color in the images. In some aspects, the method may include using edge detection on one or more of the different regions of the camera images and the intensity image from the laser scanner. The method may further include comparing the edges inside each different region to the laser scan generated edges to determine which image region is the closest to the laser scan. The method may include creating a composite image including the image regions most closely matching the laser scan.

In some configurations of the method, more than one laser scan of the scene may be taken and these multiple laser scans may be used to produce an intensity image with fewer moving objects by comparing the depth images of each of the laser scans. The image regions may be compared to the same region (or matching region) in the corresponding intensity image. In some aspects, the comparison may be performed by generating a list of computer vision key points in the image regions and in the matching intensity image regions. Image key points may be generated by known computer vision image matching algorithms such SIFT (Scale Invariant Feature-Transform) and FAST (Features from Accelerated Segment Test), among others. Features may also be created from the intensity image. Camera image key points and intensity image key points may be matched using any suitable computer vision techniques, such as by location or by descriptors, or using a combination thereof.

In some aspects, the field of view of the set of camera images is either smaller or larger than the field of view of the intensity image of the laser scan. If the field of view of the camera image is inside of the field of view of the intensity image, the image regions that have differences between image sets may be included completely within intensity image. Such configurations may permit the method to be applied without complicated algorithms. If the camera images have a field of view larger than the intensity image, then the method may be applied in areas where the regions of differences intersect some region of the intensity image. The decision as to which of the camera image regions to use may then be made on the intersection of the region of camera difference and the intensity image.

In further aspects, more than two sets of camera images may be taken of a scene. In configurations with more than two sets of camera images, comparing regions between three or more images may be implemented to determine which images contain moving objects. The camera images may be compared by using either at a pixel level, with edge detection, or key points detected. If none of the camera image regions are strongly similar, then this region can be passed to be checked against the intensity image.

In some configurations, the method may include selecting regions of pixels from two or more sets of source images. In one view, a composite of the sets of images may be shown. The user may select a source of images and a small, adjustable region of pixels of the source image is shown in place on the composite view. The user may select to use this new source, move to a new location, or change the size or shape of the patch of source pixels being displayed. In one view, a composite of the sets of images may be shown. The regions of camera image disagreement may be shown to the user either by highlight or by outline. The user may then view and manipulate each region of disagreement, and may use an input to select which source image to use in the region of camera image disagreement. Accordingly, in some embodiments the regions which match the scan may be automatically select, and having the areas aggregated can make the process of editing or correcting the automatic decisions more efficient for people who do need to correct errors.

In some configurations, the method may include combining sets of images taken at different times with image regions of difference embedded inside of regions of agreement. In each region of agreement, a selection between image sources may be determined. For example, in some configurations the selection between image sources may be determined by the methods described above. Alternatively, the selection between image sources may be determined by a user. Each region of camera image disagreement may be enlarged using common techniques, for example, a suitable image morphology dilate operation. Inside this identified border region the source images may be in agreement but may not be exactly the same. The pixels in this region may be combined from the source images by any suitable blending technique where the source image at the edge against the region of disagreement is the decided pixel source, and the pixels at the newly formed edge in the agreement region are from the default pixel source.

Figure 5:
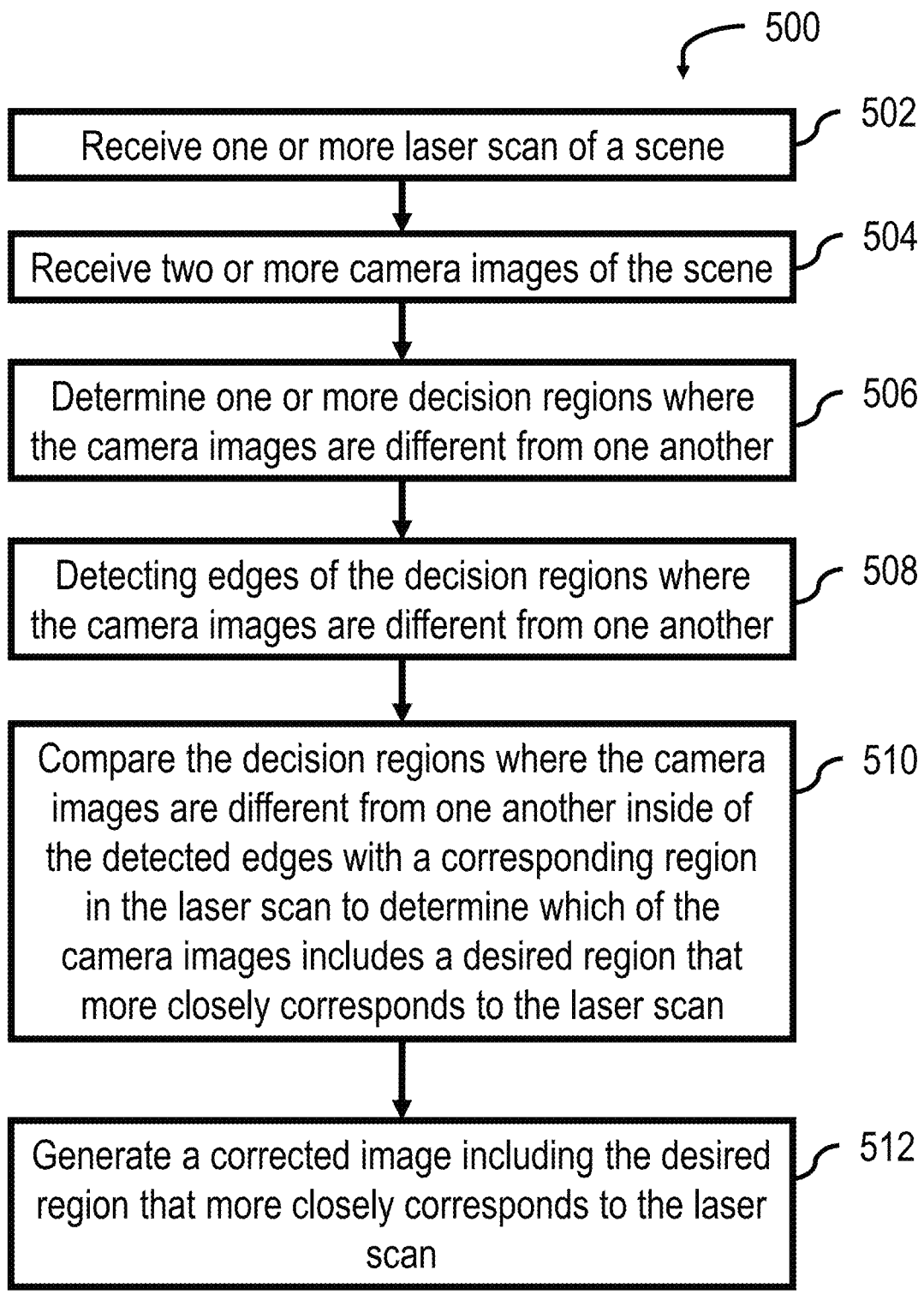

FIG. 5 illustrates a flowchart of an example method 500 according to the concepts described herein. The method 500 may be arranged in accordance with at least one embodiment described in the present disclosure. One or more operations of the method 500 may be performed, in some embodiments, by a device or system, such as the laser scanner 100 of FIGS. 1A-1B and/or the computing device 400 of FIG. 4 or another device, combination of devices, or system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, in which one or more laser scan of a scene maybe received. In some aspects, the laser scan may include a three-dimensional point cloud of the scene. The laser scan may be obtained, for example, from a laser rangefinder of a laser scanner, such as the laser rangefinder 108 of FIGS. 1A-1B. Accordingly, the laser scan may be received from the laser rangefinder. In some aspects, the laser scan may be represented as an intensity image.

At block 504, two or more camera images of the scene may received. The camera images may be taken at different times from one another. In some aspects, the camera images of the scene may be obtained using a camera, for example, such as the cameras 104 and/or 106 of FIGS. 1A-1B. Accordingly, the camera images may be received from a camera. In some aspects, the camera may be a visual internal system (VIS) camera or a high dynamic range (HDR) camera.

At block 506, one or more decision regions where the camera images are different from one another may be determined.

At block 508, edges of the decision regions where the camera images are different from one another may be detected. In some aspects, edges inside of the each of the decision regions where the camera images are different from one another may be detected.

At block 510, the decision regions are compared to determine where the camera images are different from one another using the detected edges with a corresponding region in the laser scan. Further, which of the camera images includes a desired region that more closely corresponds to the laser scan may be determined. The edges inside of the decision region may be used to determine similarity between the intensity image and the camera images. Thus, the method may include comparing the decision regions where the camera images are different from one another with a corresponding region in the laser scan to determine, using the detected edges, which of the camera images includes a desired region that more closely corresponds to the laser scan.

At block 512, a corrected image may be generated. The corrected image may include the desired region that more closely corresponds to the laser scan from the determined camera image that includes the desired region that more closely corresponds to the laser scan.

In some aspects, the decision regions where the camera images are different from one another may be determined based on statistical differences in pixels or groups of pixels. The decision regions where the camera images are different from one another may be determined based on statistical differences in color of pixels or groups of pixels.

The method 500 may include consolidating groups of pixels or removing groups of pixels based on a size of an area of the groups of pixels.

In some aspects, a field of view of the camera images may be larger than a field of view of the laser scan. In other aspects, the field of view of the camera images may be smaller than a field of view of the laser scan. In such aspects, the method 500 may include applying the camera images to a portion of the laser scan, and the portion may correspond to the field of view of the camera images.

In some aspects, the camera images of the scene may include more than two camera images. In such aspects, each of the camera images may be compared to one another.

Determining one or more decision regions may include grouping areas of pixels with similarities. Determining one or more decision regions may include generating a mask that at least encompasses a moving object in the camera images.

The method 500 may include performing morphology operations on the decision regions. The method 500 may include performing dilation or erosion operations on the decision regions.

In some aspects, a resolution of the laser scan may be different than a resolution of the camera images. In such aspects, the method 500 may include projecting the camera images and the lasers scan to a matching resolution.

Generating the corrected image may include blending two or more of the camera images with one another. Generating the corrected image may include removing a moving object in the camera images.

In some aspects, the method 500 and/or any suitable aspects described above may be performed by a laser scanner including a laser rangefinder configured to acquire a three-dimensional point cloud of a scene, one or more cameras configured to obtain camera images of the scene, at least one computer-readable media configured to store instructions, and at least one processor coupled to the computer-readable media. The at least one processor may be configured to execute the instruction to cause the processor to perform the method 500.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 5 without departing from the scope of the present disclosure. For example, the method 500 may include more or fewer elements than those illustrated and described in the present disclosure.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method comprising:
   receiving one or more laser scan of a scene, the laser scan including a three-dimensional point cloud of the scene;
   receiving two or more camera images of the scene, wherein the camera images are taken at different times from one another;
   determining one or more decision regions where the camera images are different from one another;
   detecting edges in the decision regions where the camera images are different from one another;
   comparing the decision regions where the camera images are different from one another with a corresponding region in the laser scan to determine, using the detected edges, which of the camera images includes a desired region that more closely corresponds to the laser scan; and
   generating a corrected image including the desired region that more closely corresponds to the laser scan.

2. The method of claim 1, wherein the decision regions where the camera images are different from one another are determined based on statistical differences in pixels or groups of pixels.

3. The method of claim 1, wherein the decision regions where the camera images are different from one another are determined based on statistical differences in color of pixels or groups of pixels.

4. The method of claim 1, wherein the laser scan is obtained using a laser rangefinder of a laser scanner.

5. The method of claim 1, wherein the laser scan is represented as an intensity image.

6. The method of claim 1, wherein the camera images of the scene are obtained using a camera.

7. The method of claim 6, wherein the camera is a visual internal system (VIS) camera or a high dynamic range (HDR) camera.

8. The method of claim 1, further comprising consolidating groups of pixels or removing groups of pixels based on a size of an area of the groups of pixels.

9. The method of claim 1, wherein a field of view of the camera images is larger than a field of view of the laser scan.

10. The method of claim 1, wherein a field of view of the camera images is smaller than a field of view of the laser scan, the method further comprising applying the camera images to a portion of the laser scan, the portion corresponding to the field of view of the camera images.

11. The method of claim 1, wherein the two or more camera images of the scene include more than two camera images, further comprising comparing each of the camera images to on another.

12. The method of claim 1, wherein determining one or more decision regions further comprises grouping areas of pixels with similarities.

13. The method of claim 1, wherein determining one or more decision regions further comprises generating a mask that at least encompasses a moving object in the camera images.

14. The method of claim 1, further comprising performing morphology operations on the decision regions.

15. The method of claim 1, further comprising performing dilation or erosion operations on the decision regions.

16. The method of claim 1, wherein a resolution of the laser scan is different than a resolution of the camera images.

17. The method of claim 16, further comprising projecting the camera images and the lasers scan to a matching resolution.

18. The method of claim 1, wherein generating the corrected image further comprises blending two or more of the camera images with one another.

19. The method of claim 1, wherein generating the corrected image further comprises removing a moving object in the camera images.

20. A laser scanner comprising:
   a laser rangefinder configured to acquire a three-dimensional point cloud of a scene;
   one or more cameras configured to obtain camera images of the scene;
   at least one computer-readable media configured to store instructions; and
   at least one processor coupled to the computer-readable media, the at least one processor configured to execute the instruction to cause the processor to perform the method of claims 1.

* * * * *